(12) United States Patent
Presti

(10) Patent No.: US 6,261,409 B1
(45) Date of Patent: Jul. 17, 2001

(54) INNER CURING ENVELOPE FOR USE IN RETREADING TIRES

(75) Inventor: Darryl C. Presti, Chalfont, PA (US)

(73) Assignee: Presti Rubber Products, Inc., New Britain, PA (US)

( * ) Notice: Subject to any disclaimer, the term of this patent is extended or adjusted under 35 U.S.C. 154(b) by 0 days.

(21) Appl. No.: 09/325,594

(22) Filed: Jun. 3, 1999

Related U.S. Application Data
(60) Provisional application No. 60/122,683, filed on Mar. 3, 1999.

(51) Int. Cl.⁷ .................................................. B29D 30/56
(52) U.S. Cl. ........................... 156/394.1; 156/87; 156/96; 156/909; 425/17; 425/812
(58) Field of Search .................. 156/96, 909, 394.1, 156/87, 416; 425/23, 14, 43, 44, 45, 52, 53, 49, 812

(56) References Cited

U.S. PATENT DOCUMENTS

| | | |
|---|---|---|
| 3,170,195 * | 2/1965 | Knox ..................................... 425/812 |
| 3,745,084 | 7/1973 | Schelkmann . |
| 4,185,056 | 1/1980 | Detwiler . |
| 4,293,293 * | 10/1981 | MacMillan ............................ 425/23 |
| 4,500,375 | 2/1985 | Goldstein . |
| 5,007,978 | 4/1991 | Presti . |
| 5,098,268 | 3/1992 | Robinson . |
| 5,173,353 | 12/1992 | Yamamoto . |
| 5,306,130 | 4/1994 | King et al. . |
| 5,882,471 | 3/1999 | Chandler et al. . |
| 6,056,852 * | 5/2000 | Presti et al. ....................... 156/394.1 |

OTHER PUBLICATIONS

Co-pending U.S. Patent Application No. 09/046,357 filed on Mar. 23, 1998 and assigned to the assignee of the present application.

* cited by examiner

*Primary Examiner*—Geoffrey L. Knable
(74) *Attorney, Agent, or Firm*—Howson and Howson

(57) ABSTRACT

An inner curing envelope for use during a tire retreading process. The inner curing envelope is placed within the inside of a tire casing and cooperates with an outer sealing envelope for encasing a tire. A plurality of grooves are molded in a tire confronting face of the inner curing envelope to provide passageways to ensure that air/gas located adjacent the interior surface of the tire casing is completely evacuated when a vacuum is drawn within the envelopes.

17 Claims, 2 Drawing Sheets

INNER CURING ENVELOPE FOR USE IN RETREADING TIRES

This application claims the benefit of U.S. Provisional Application Ser. No. 60/122,683, filed Mar. 3, 1999.

FIELD OF THE INVENTION

The present invention relates generally to tire retreading, and more particularly, the present invention relates to an improved inner curing envelope which provides enhanced wicking capability so that a vacuum can be efficiently drawn between the envelope and interior surface of a tire casing.

BACKGROUND OF THE INVENTION

An example of a tire retreading process which utilizes both inner and outer curing envelopes to completely encase a tire is disclosed in the present assignee's U.S. Pat. No. 5,007,978 issued to Presti. Worn tread on a used tire casing is buffed off to a profile suitable for mounting a new tread. A pre-cured and buffed tread is adhered about the periphery of the casing with a lamina of uncured cushion gum cemented between the tread and the casing. The tire is encased within separate outer and inner curing envelopes and a vacuum is drawn between the envelopes and the tire for stretching the envelopes into intimate contact with all surfaces of the tread and casing. The tire is then placed in an autoclave for several hours at an elevated temperature and pressure to cure the gum and positively bond the casing and tread. The curing envelopes are removed and the retreaded tire is ready for use.

An important step in the above-described tire retreading process is the formation of a vacuum between the curing envelopes and the tire. The vacuum ensures that air or steam does not penetrate into the cushion gum during curing of the gum because the presence of air bubbles, or pockets of air, between the curing envelopes and the tire will prevent proper curing of the gum and will cause tread distortion. In addition, air pockets prevent pressure from being uniformly applied over the entire bonding area which also causes tread distortion.

To eliminate the formation of air pockets between the outer curing envelope and the tire casing and tread, and to ensure the complete evacuation of air from between the outer curing envelope and the tire, the present assignee has long suggested to its customers the placement of a separate wicking material between the outer curing envelope and the tire. Conventionally, the recommended wicking material was a strip of multiple ply nylon. More recently, the recommended wick is that disclosed in the present assignee's U.S. patent application No. 09/046,357, filed on Mar. 23, 1998.

Other tire retreading procedures having enhanced wicking capabilities are disclosed in U.S. Pat. No. 5,173,353 issued to Yamamoto and U.S. Pat. No. 5,306,130 issued to King et al. Neither patent discloses the use of an inner curing envelope; rather, both disclose retreading methods which utilize an outer curing envelope only. The Yamamoto patent discloses placing a separate strip of nylon cloth between the outer curing envelope and the tire for venting purposes. See column 1, lines 14–16 and 27–30 of Yamamoto. The King patent discloses integrally providing a plurality of air passageways on the entire tire confronting face of its outer curing envelope.

Although various ones of the above-referenced retreading wicks or means to vent air between an outer curing envelope and a tire may be satisfactory for their intended purposes, there is a need for an improved means of venting air/gas between an inner curing envelope and the interior surface of a tire casing. Typically, a separate wicking belt is too difficult to properly position between the interior surface of the tire casing and the inner curing envelope. This is especially true if multiple, spaced-apart wicking belts are required to be located between the inner curing envelope and the tire casing. Thus, the wicking means should be capable of ready positioning between the inner curing envelope and the interior surface of the tire casing and should prevent the formation of air pockets when a vacuum is drawn.

OBJECTS OF THE INVENTION

With the foregoing in mind, a primary object of the present invention is to provide a novel inner curing envelope which is used to retread tires and which has means for preventing the formation of air pockets adjacent the interior surface of the tire casing.

Another object of the present invention is to provide an inner curing envelope providing improved wicking and capable of ready positioning inside a tire casing.

A further object of the present invention is to provide an inner curing envelope which is durable so that it is capable of re-use over an extended period.

SUMMARY OF THE INVENTION

More specifically, the present invention provides a re-useable, inner annular curing envelope used for retreading tires. The one-piece, integrally formed envelope is molded of an elastomeric material and has a substantially U-shaped radial crosssection which is complementary to the shape of an interior surface of a tire casing. The inner annular curing envelope includes a peripheral portion and a pair of skirt portions for contiguously contacting the interior surface of the tire casing. The improvement comprises the formation of a plurality of grooves in a section of the peripheral and skirt portions of the envelope. The grooves provide a plurality of air passageways which facilitate complete evacuation of air between the inner curing envelope and the interior surface of the tire casing when a vacuum is drawn.

BRIEF DESCRIPTION OF THE DRAWINGS

The foregoing and other objects, features and advantages of the present invention should become apparent from the following description when taken in conjunction with the accompanying drawings, in which.

DETAILED DESCRIPTION OF THE PREFERRED EMBODIMENT

Figure 2:
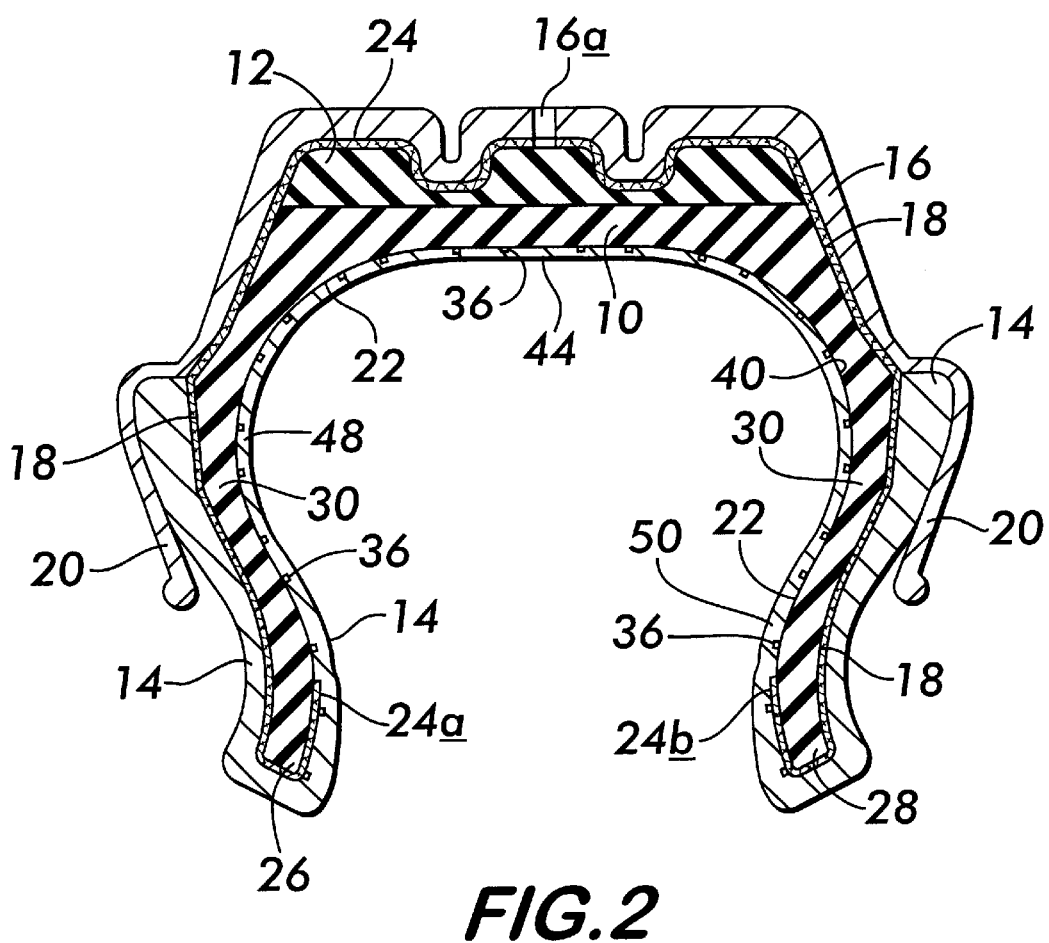
FIG. 2 is a radial cross-sectional view of a tire being retreaded using an inner curing envelope having the wicking pattern illustrated in FIG. 1.

As discussed above, tires having worn treads can be retreaded for re-use. FIG. 2 illustrates a casing 10 of a worn tire in which old worn tread (not shown) has been removed and replaced with a strip of new pre-cured tread 12. The tread 12 is adhered to the outer periphery of the casing 10 with a lamina of uncured cushion gum (not shown) cemented between the tread 12 and the casing 10. When the gum is cured, the tread 12 is permanently attached to the casing 10.

As stated above, an example of a system for retreading tires utilizing both inner and outer curing envelopes is disclosed in the present assignee's U.S. Pat. No. 5,007,978 issued to Presti. The disclosure of Presti '978 patent is incorporated herein by reference.

As illustrated in FIG. 2, the tire casing 10, new tread 12 and uncured gum are encased within an inside curing envelope 14 and an outside curing envelope 16 before being placed within an autoclave. To this end, the inside curing envelope 14 snugly fits against the entire interior surface 22 of the tire casing 10. The inner envelope 14 also extends around the terminating beads, 26 and 28, of the tire casing 10 and against a portion of the outer sidewall 18 of the tire casing 10. The outside curing envelope 16 fits over the tread 12 and along the outer sidewall 18 of the casing 10. The outside curing envelope 16 has a skirt 20 overlapping a portion of the inside curing envelope 14 and forming an air tight seal between the curing envelopes, 14 and 16. The reusable curing envelopes, 14 and 16, are made of a durable high-heat resistant synthetic rubber and are formed by molding techniques in the exact shape of the specific tire being retreaded.

After the curing envelopes, 14 and 16, are positioned to encase the tire casing 10, tread 12 and uncured gum (not shown), a vacuum is drawn between the curing envelopes and the tire casing and tread. To this end, a valve (not shown) extends through the outside curing envelope 16 at aperture 16a and is connected to a pump (not shown) for drawing a vacuum. See FIG. 2.

It is important for proper curing that all air between the curing envelopes, 14 and 16, and the tire casing 10 and tread 12 be evacuated and that formation of air pockets be prevented. Typically, a wick 24 is positioned between the outside curing envelope 16 and the tread 14 and outer sidewall 18 of the tire casing 10. As illustrated in FIG. 2, the wick 24 can be, for instance, a strip of fabric, such as a multiple-ply nylon, and can terminate at opposite ends, 24a and 24b which wrap around the inside of terminating beads, 26 and 28, respectively, of the tire sidewalls 30.

While wick 24 aids the evacuation of air between the outer envelope 16 and the outer sidewall 18 of the casing 10 and the tread 12, it does not efficiently prevent pockets of air from becoming isolated at locations between the interior surface 22 of the tire casing 10 and the inner curing envelope 14. The placement of a separate piece of wicking material inside the tire casing, such as by lengthening the wick 24, significantly complicates the task of properly encasing the tire within the envelopes, 14 and 16.

Figure 1:
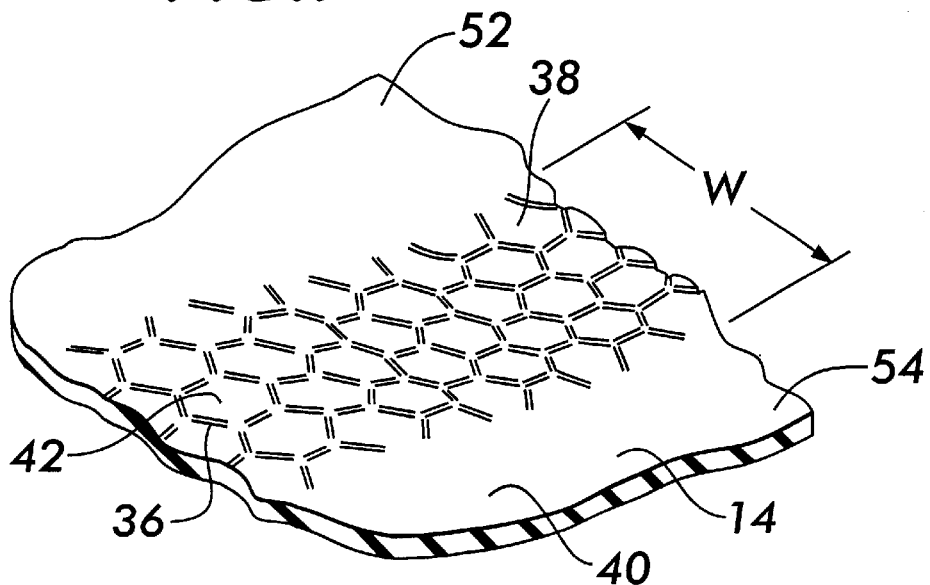
FIG. 1 is a perspective view of a portion of an inner curing envelope having formed therein a wicking pattern embodying the present invention.

To overcome the aforementioned problem, the inner curing envelope 14 of the present invention is molded with a series of grooves 36 to from a plurality of air/gas passageways. For example, as illustrated in FIG. 1, a band-shaped section 38 of the tire-confronting face 40 of the inner curing envelope 14 is formed with an integral array of closely spaced geometric forms 42 which provide a grid-like network of grooves 36. Thus, when a vacuum is drawn, the grooves 36 provide a clear path to the wick 24 for the evacuation of air/gas adjacent the interior surface 22 of the casing 10. Since the formation of pockets of air is eliminated, the inner curing envelope 14 is properly stretched into tight engagement with the tire casing 10.

Preferably, the grooved sections 38 of the envelope 14 are formed in narrow radial bands extending continuously between the opposite ends 24a and 24b of the wick 24. The inner annular envelope 14 includes a peripheral portion 44 and a pair of skirt portions, 48 and 50, which provide the annular envelope 14 with an inwardly-opening U-shaped radial cross-section. The bands 38 extend transversely across the peripheral portion 44 and continuously along the skirt portions, 48 and 50, to locations adjacent each terminating bead, 26 and 28, of the tire casing 10.

Figure 3:
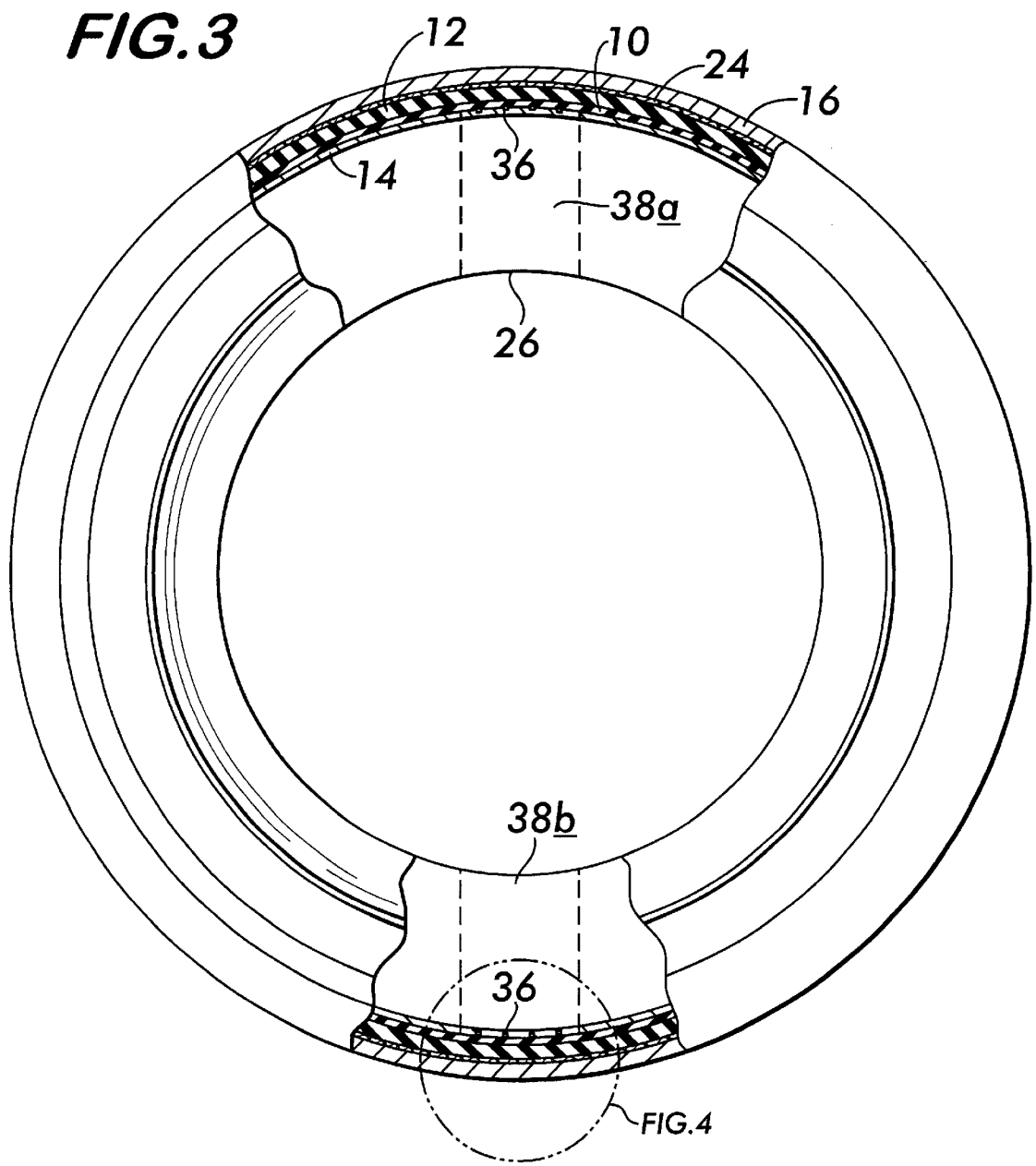
FIG. 3 is a cutaway elevational view of the tire being retreaded as illustrated in FIG. 2.
Figure 4:
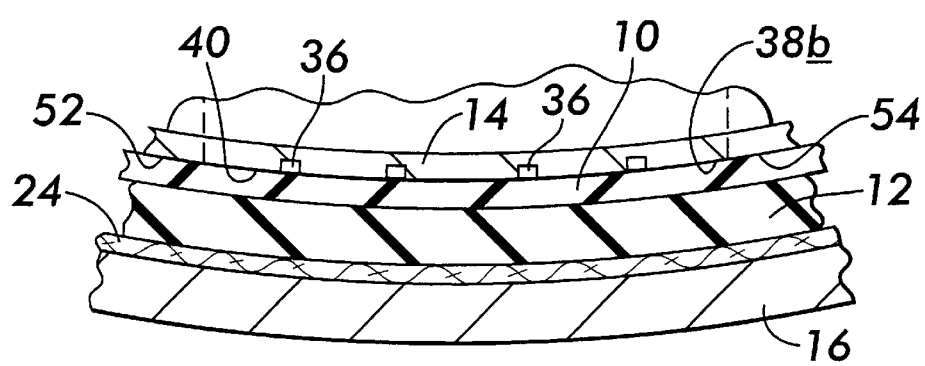
FIG. 4 is an enlarged cross-sectional view of a portion of the tire illustrated in FIG. 3.

Preferably, the inner curing envelope 14 is provided with multiple, spaced-apart, identically-configured bands, such as, bands 38a and 38b illustrated in FIG. 3. Bands 38a and 38b are preferably at diametrically opposed locations on the envelope 14. Radial sections 52 and 54 of the face 40 between the bands 38a and 38b are formed with substantially smooth surfaces. Thus, a majority of the surface area of the face 40 of the inner envelope 14 is formed smooth, and a minority of the surface area of the face 40 has grooves 36 formed therein.

By way of example, and not by way of limitation, each band 38a and 38b has a radial width "W" of between about 1 inch to about 10 inches. See FIG. 1. The size of the bands are such that preferably less than 10% of the entire surface area of face 40 of the envelope 14 has grooves 36. Alternatively, if more venting capability is desired, up to 25% or 50% of the surface area of face 40 can be provided with grooves 36. The grooves 36 are formed with a maximum depth of between about 0.001 inch to about 0.25 inches and a width of between about 0.001 to about 0.25 inches. Preferably, the depth of the grooves 36 decrease as they approach the tire beads 26 and 28. In the illustrated embodiment, the grooves 36 are of hexagonal interconnecting configuration to maximize flow. However, if desired, other configurations, such as provided between cylindrical bosses, may function to some degree.

Thus, the inner curing envelope of the present invention provides a ready means of wicking air from between the interior surface of the casing and the face of the inner curing envelope. The inner envelope with the wicking means according to the present invention does not complicate the installation task of the envelope and wick inside the casing since the wicking pattern is formed directly on the face of the inner envelope.

While an inner curing envelope has been described in detail, various modifications, alterations, and changes may be made without departing from the spirit and scope of the envelope according to the present invention as defined in the appended claims.

What is claimed is:

1. An inner annular curing envelope for use in retreading a tire casing having an interior surface outer sidewalls and a pair of terminating beads, comprising:

a one-piece inner annular curing envelope molded of an elastomeric material and having a peripheral portion and a pair of skirt portions for contiguously contacting the interior surface of the tire casing, each of said skirt portions extending inwardly from said peripheral portion to an innermost annular edge and having an annular flange extending outwardly therefrom and reversely turned along said skirt portion so that, when installed on a tire casing, said flanges of said inner annular curing envelope extend around the terminating beads of the tire casing and engage a portion of the outer sidewall of the tire casing, and a section of said peripheral portion and said pair of skirt portions being formed with a network of grooves to provide radial air passageways which facilitate complete evacuation of air between said inner curing envelope and the interior surface of the tire casing.

2. An inner curing envelope according to claim 1, wherein said peripheral portion and said skirt portions have a substantially smooth tire casing-engaging surface except for said section having said passageways which is formed as at least one continuous radial band extending on said tire casing-engaging surface from one of said skirt portions, transversely across said peripheral portion, to the other of said skirt portions.

3. An inner curing envelope according to claim 2, wherein said band has a width in a circumferential direction of said envelope of between about one inch to about ten inches.

4. An inner curing envelope according to claim 3, further comprising a second band of passageways spaced from said first band of passageways.

5. An inner curing envelope according to claim 4, wherein said network of grooves defines an array of closely spaced geometric forms.

6. An inner curing envelope according to claim 5, wherein said grooves extend to a depth, and said depth of said grooves adjacent said innermost annular edge of said skirt portions is less than said depth of said grooves located on, and adjacent to, said peripheral portion.

7. A curing envelope assembly for use in retreading a tire casing in a process requiring a vacuum to be drawn between said curing envelope assembly and the retreaded tire casing encased entirely therein, comprising:

an outer annular curing envelope molded of an elastomeric material and having a substantially U-shaped radial cross-section which is complementary to a shape of an exterior surface of the retreaded tire casing;

an inner annular curing envelope molded of an elastomeric material and having a peripheral portion and a pair of skirt portions which are substantially U-shaped in radial cross-section complementary to the shape of an interior surface of the tire casing for contiguously contacting the interior surface of the tire casing, each of said skirt portions of said inner annular curing envelope extending inwardly from said peripheral portion to an innermost annular edge and having an annular flange extending outwardly therefrom and reversely turned along said skirt portion so that, when installed on a tire casing, said flanges of said inner annular curing envelope extend around the terminating beads of the tire casing and engage a portion of the outer sidewall of the tire casing, and said peripheral and skirt portions of said inner annular curing envelope having a face for confronting the interior surface of the tire casings said face including a major portion formed with a substantially smooth surface and a minor portion having a network of air passageways formed therein, said network of passageways extending continuously on said peripheral portion and said pair of skirt portions to facilitate complete evacuation of air from between said face and the interior surface of the tire casing.

8. A curing envelope assembly according to claim 7, wherein said minor portion of said face having said passageways is formed by at least one band extending transversely across said peripheral portion and continuously therefrom along each of said skirt portions.

9. A curing envelope assembly according to claim 8, wherein said band has opposite ends which extend to said innermost annular edges of said skirt portions.

10. A curing envelope assembly according to claim 9, wherein said face has at least two spaced bands of passageways which are located at diametrically opposed positions on said face of said inner curing envelope.

11. A curing envelope assembly according to claim 10, wherein each of said bands is identical and has a width in a circumferential direction of said inner curing envelope of between about one inch to about ten inches.

12. A curing envelope assembly according to claim 7, wherein said reversely-turned annular flanges of said inner annular curing envelope are engageable with said outer annular curing envelope to form a leak-resistant enclosure.

13. A tire retreading assembly, comprising:

a tire casing having an interior surface, a new strip of precured tread positioned around an outer periphery thereof, and outer sidewalls terminating in annular tire beads, an outer annular elastomeric curing envelope overlying said tread and a portion of said outer sidewalls of the tire casing adjacent said tread; and an inner annular elastomeric curing envelope having a peripheral portion and a pair of skirt portions which are substantially U-shaped in radial cross-section complementary to the shape of said interior surface of said tire casing for contiguously contacting said interior surface of said tire casing;

said skirt portions of said inner annular curing envelope extending inwardly from said peripheral portion to innermost annular edges and having reversely turned flanges extending outwardly from said innermost annular edges to encase said annular tire beads of said tire casing and confront a portion of said outer sidewalls of said tire casing;

said reversely turned flanges of said inner annular curing envelope being overlapped by said outer annular curing envelope to form a leak-resistant enclosure about the tire casing and tread; and said peripheral and skirt portions of said inner annular curing envelope having a face that confronts the interior surface of the tire casing, said face having a substantially smooth surface except for at least one radially extending band having grooves molded therein providing a continuous network of air passageways extending across said peripheral portion and said pair of skirt portions so that air is capable of being evacuated from between said inner curing envelope and the interior surface of the tire casing.

14. A tire retreading assembly according to claim 13, wherein said band forms less than half of the entire surface area of said face of said inner curing envelope.

15. A tire retreading assembly according to claim 14, wherein said band forms less than about 25% of the entire surface area of said face of said inner curing envelope.

16. A tire retreading assembly according to claim 15, wherein said band forms less than about 10% of the entire surface area of said face of said inner curing envelope.

17. A tire retreading assembly according to claim 16, wherein said grooves are formed at a predetermined depth, and wherein said depth decreases on said skirt portions as said grooves approach a location adjacent the annular beads of the tire casing.

* * * * *